March 19, 1935.  R. P. F. LIDDELL  1,994,656
FILTER
Filed Dec. 8, 1931

INVENTOR
Robert P. F. Liddell
BY Kenyon & Kenyon
ATTORNEYS

Patented Mar. 19, 1935

1,994,656

UNITED STATES PATENT OFFICE 1,994,656

FILTER

Robert P. F. Liddell, Morris Township, Morris County, N. J., assignor to Motor Improvements, Inc., Newark, N. J., a corporation of Delaware Application December 8, 1931, Serial No. 579,669

16 Claims. (Cl. 210—167)

This invention relates to filters and has for an object an improved filter having provision for flowing filtered fluid reversely through the filter unit for the purpose of removing therefrom solid material filtered from the fluid and collected by the filtering unit.

A filter embodying this invention comprises a casing having inlet and outlet ports and being divided into inlet and outlet sections by a filtering unit. Manually operable means are provided for decreasing the capacity of the outlet section and increasing the capacity of the inlet section to cause filtered fluid to flow reversely through the filtering unit without any change in the contents of the casing, the reverse flow being effective to remove filter cake from the filter unit. Preferably, the filter unit comprises a metal cylinder having a large number of narrow slots, the cylinder surrounding and being supported by a fluted drum. The flutes in the drum form channels communicating with the interior of the drum and through which the filtered fluid is conducted away from the filtering slots. Within the drum there is provided a tube having communication both with the interior of the drum and the space between the casing wall and the filter unit. A manually operable plunger is slidably mounted in the tube and during normal operation of the filter is so arranged that the tube is filled with filtered fluid. A self-closing valve is provided for the outlet port and means are provided on the plunger for holding the valve open when the plunger is in normal position. Movement of the plunger from normal position permits closure of the valve and also decreases the capacity of the outlet section while increasing the capacity of the inlet section so that filtered fluid is forced reversely through the filtering unit and unfiltered oil is drawn into the tube. Return of the plunger to normal position restores the original capacities of the two sections and the tube is again filled with filtered oil and the outlet valve is open. Closure of the outlet valve prevents escape of filtered fluid through the outlet. In such a filter, the filter unit is cleaned without change in the contents of the casing and the cleaning of the filter unit is effected without any loss of filtered or unfiltered fluid.

Other objects, novel features and advantages of this invention will be apparent from the following specification and accompanying drawing, wherein.

Figure 1:
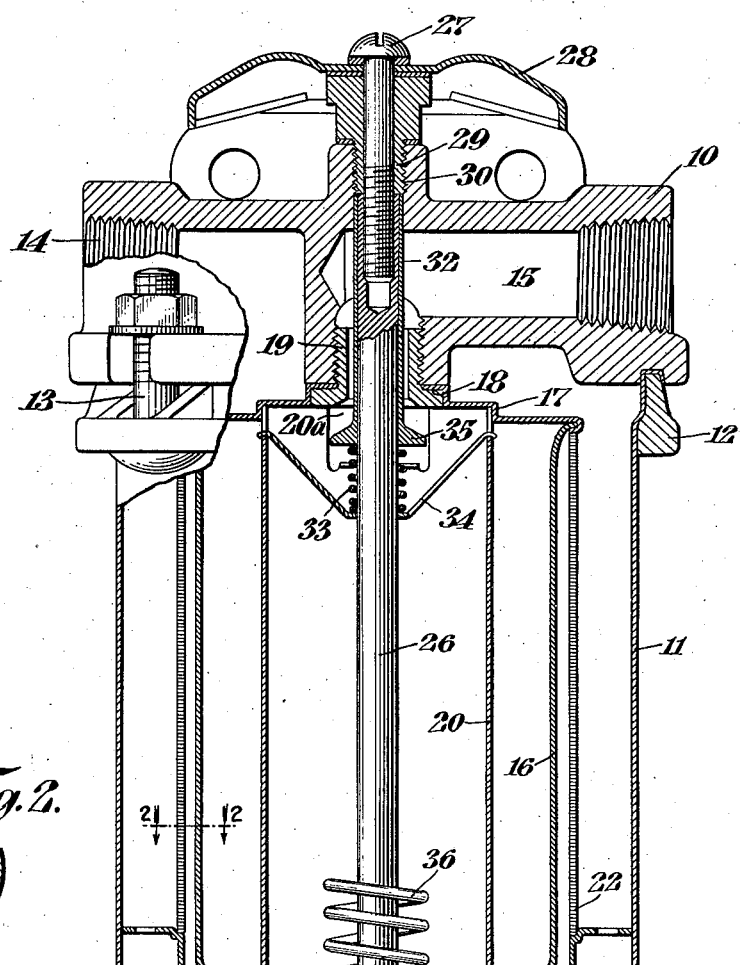
Fig. 1 is a vertical section through an embodiment of the invention.
Figure 2:
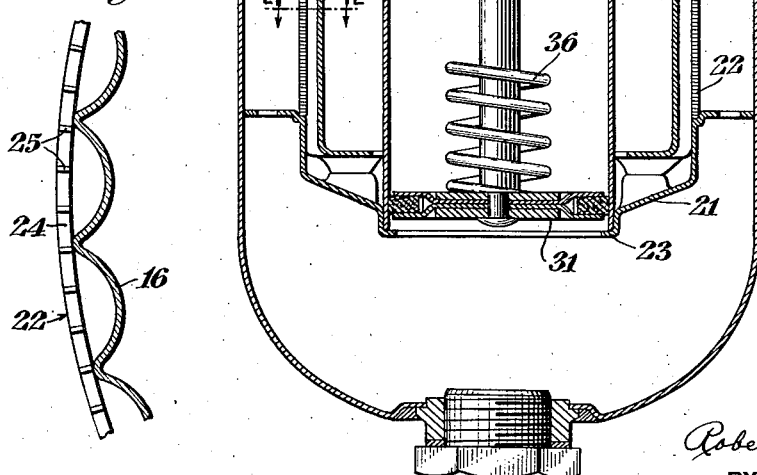
Fig. 2 is an enlarged section on the line 2—2 of Fig. 1.

In the drawing, 10 is a head to which a shell 11 is attached by means of a collar 12 clamped to the head 10 by means of bolts 13. In the head is provided an inlet passage 14 and an outlet passage 15, the outlet passage having a portion arranged axially of the casing. A fluted drum 16 has offset portions 17 and 18 in one end. A collared tubular fitting 19 is arranged in the offset portion 18 and is threaded into the axial portion of the outlet passage 15, to support the drum from the head. A tube 20 is arranged within the drum and has its upper end fitting into the offset portion 17. The other end of the tube 20 extends through an aperture in the bottom wall of the drum, this aperture being provided with a serrated edge.

A cup-shaped cap 21 receives the lower end of the drum 16 and between the upper edge of this member and the top of the drum there is arranged a cylindrical filtering unit 22. This cylinder forms with the fluted cylinder a plurality of channels communicating with the reservoir formed between the lower end of the drum, the cap 21 and the lower end of the tube 20 which is received in the offset portion 23 of the cap 21, this offset portion having an aperture through which the tube 20 communicates with the inlet section of the filter. The reservoir communicates with the interior of the drum through the passageway formed by the serrated edge of the aperture through which the tube 20 extends and an aperture 20a in the top of the tube 20 provides communication between the interior of the drum and the interior of the tube.

The filtering unit 22 is composed of a cylinder comprising a helix wound from a thin metal ribbon 24 wound with the wide faces thereof normal to the axis of the helix, the ribbon being preformed with definite curvature so that its turns lie smoothly in contact with each other. This ribbon is of minute thickness and is provided at intervals with spaced ribs 25 which separate the adjacent turns and form filtering slots through which the fluid is passed. The ribbon preferably is approximately .045 inch wide and .006 inch thick, while the ribs preferably are from .001 to .002 inch in height.

A rod 26 is attached by means of a bolt 27 to a handle 28 having a threaded boss 29 screwed into a threaded recess 30 in the head 10. At its other end, the rod 26 carries a piston 31, the rod 26 passing through the fitting 19 and extending to the lower end of the tube 20. A sleeve 32 surrounds the rod 26 and its upper end bears against the lower end of the boss 30. The sleeve 32 is held in engagement with the boss 30 by a spring 33 which is interposed between the lower end of the sleeve and a frame 34 mounted in the upper end of the tube 20. The lower end of the sleeve 32 is flared to provide a valve 35 adapted to close the outlet passage 15. When the boss 19 is screwed into its cooperating recess 30, the valve 35 is held open, but when the boss 29 is screwed out of the recess 30 and the plunger is lifted, the spring 33 carries the valve 35 into closed position. A spring 36 is carried by the plunger to engage the frame 34 and cushion the up-stroke of the plunger.

Oil to be filtered is introduced through the inlet 14 into the space between the filter unit and the casing wall and after passing through slots in the filter unit flows through the channels into the reservoir and then upwardly around the tube 20 into the interior of the drum. From the drum it flows through the aperture 20a into the tube 20 and then through the fitting 19 into the outlet passage 15. Filter cake collecting on the exterior surface of the filter unit 22 is removed by causing reverse flow of filtered oil through the filter unit. The handle 28 is rotated to unscrew the boss 29 from the recess 30 and the plunger is pulled upwardly, the valve 35 being closed by the spring 33. Upward movement of the plunger causes filtered fluid to flow from the tube 20 through the aperture 20a into the interior of the drum through the reservoir, then through the channels and downwardly through the slots in the filter unit while unfiltered oil flows upwardly into the tube 20. Loss of filtered fluid through the outlet is prevented by closing of the valve 35 and the vacuum produced in the tube under the plunger draws the unfiltered oil into the tube, thus providing space for the reversely flowing filtered fluid. The return of the plunger to its original position returns the fluid to the position from which it was displaced.

It is of course apparent that various modifications may be made in the structure above described, without in any way departing from the spirit of the invention as defined in the appended claims.

I claim:

1. In a filter, a casing having inlet and outlet ports, a filter unit interposed between said inlet and outlet and dividing the casing into inlet and outlet sections, a tube communicating with both the inlet and outlet sections, a plunger slidably mounted in said tube, a self-closing valve for said outlet, and means on said plunger for holding said valve open in one position of the plunger.

2. A filter comprising a casing having inlet and outlet ports, a filter unit interposed between said inlet and outlet ports and dividing the casing into inlet and outlet sections, a reciprocating plunger for reducing the capacity of said outlet section and increasing the capacity of said inlet section to effect reverse flow of filtered fluid through the filter unit, a self-closing valve for said outlet port, and means on said plunger for holding said valve open in one position of the plunger.

3. A filter comprising a casing having an inlet, a fluted drum supported in said casing, a metal cylindrical filtering unit surrounding said drum and forming channels with the flutes, a cap fitting over one end of said drum and forming therewith a reservoir communicating with said channels and with the interior of the drum, a tube arranged within said drum and communicating with the interior of said drum and with the space between the casing wall and the filtering unit, a reciprocating plunger mounted in said tube, an outlet from said tube, a self-closing valve for said outlet, and means on said plunger for holding the valve open in one position of the plunger.

4. In a filter, a casing, a filter unit dividing said casing into inlet and outlet sections, a passageway connecting said inlet and outlet sections, a plunger slidable in said passageway, an outlet port from said outlet section, a self-closing valve for said port, and means on said plunger for holding said valve open in one position of the plunger.

5. A filter comprising a casing, a slotted cylinder, a fluted cylindrical drum surrounded by said cylinder, a cap forming with the end of said drum a reservoir communicating with the flutes, a tube in said drum, said tube being in communication at one end with the space between it and the drum and at the other end with the space between the cylinder and the casing, a passageway connecting said reservoir with the space between said tube and drum, a piston slidably mounted in said tube, an outlet from said tube, a self-closing valve for said outlet, and means on said plunger for holding said valve open in one position of the plunger.

6. A filter comprising a fluted drum, a slotted cylinder surrounding said drum, a cap fitting over one end of said drum and forming therewith a reservoir communicating with said flutes, a tube arranged within said drum, said tube being supported at one end by said cap and passing through an aperture in the end of the drum, clearance being provided between the edge of said aperture and the tube, a plunger slidably mounted in said tube, said tube being in communication at one end with the interior of said drum and at the other end with the space surrounding said drum, an outlet leading from said tube, a self-closing valve for said outlet, and means carried by said plunger for holding the valve open in one position of the plunger.

7. A filter comprising a casing, a filter unit dividing said casing into inlet and outlet sections, a tube communicating with both said sections, a reciprocating plunger mounted in said tube, a handle for said plunger extending exterior of said casing, an outlet passage from said tube surrounding said handle, a valve slidably mounted on said handle, a spring tending to close said valve means and said handle for holding said valve open in one position of the plunger, and means for locking said plunger in said position.

8. In a filter, a casing having an outlet passage, a tube in alinement with said outlet passage, a rod extending through said outlet passage into said tube, threaded connections between said rod and said casing, a plunger carried by the inner end of said rod, a valve slidably mounted on said rod and being adapted to close said outlet passage, and means on said rod to hold said valve open in one position of the plunger.

9. In a filter, a casing having an outlet passage, a tube in alinement with said outlet passage, a rod extending through said outlet passage into said tube, threaded connections between said rod and said casing, a plunger carried by the inner end of said rod, a valve slidably mounted on said rod and being adapted to close said outlet passage, means on said rod to hold said valve open in one position of the plunger, and resilient means tending to move said valve into closed position.

10. In a filter, a casing having an outlet passage, a tube in alinement with said outlet passage, a rod extending through said outlet passage into said tube, threaded connections between said rod and said casing, a plunger carried by the inner end of said rod, a valve slidably mounted on said rod and being adapted to close said outlet passage, means on said rod to hold said valve open in one position of the plunger, and a cylindrical filtering unit surrounding said tube and communicating with the tube adjacent said outlet passage.

11. In a filter, a casing having an outlet passage, a tube in alinement with said outlet passage, a rod extending through said outlet passage into said tube, threaded connections between said rod and said casing, a plunger carried by the inner end of said rod, a valve slidably mounted on said rod and being adapted to close said outlet passage, means on said rod to hold said valve open in one position of the plunger, a fluted drum surrounding said tube, a cylindrical filtering unit surrounding said drum, a cap fitting over the end of the drum and forming a reservoir into which the flutes discharge, a passageway leading from said reservoir into the drum, and a passageway leading from said drum into said tube.

12. A filter comprising a casing having on outlet port, a pump within said casing, a reciprocable operating rod therefor extending through said outlet port to the exterior of said casing, a valve slidably mounted on said rod and movable to open and close said outlet port, means for locking said rod, means on said rod engaging said valve to open said outlet port when the rod is locked and means engaging said valve to close said port upon outward movement of the rod.

13. A filter comprising a casing having an outlet port, a filter unit dividing the casing into inlet and outlet sections, a tube coaxial with said outlet port and communicating with both of said sections, a plunger slidably mounted in said tube, an operating rod for said plunger extending through said outlet port, and a valve slidably mounted on said plunger and movable therewith to open and close said outlet port.

14. A filter comprising a casing having an outlet port, a filter unit dividing the casing into inlet and outlet sections, a tube coaxial with said outlet port and communicating with both of said sections, a plunger slidably mounted in said tube, an operating rod for said plunger extending through said outlet port, a self-closing valve for said outlet port, and means associated with said plunger for holding said valve open in one position of the plunger.

15. A filter comprising a casing having an outlet port, pump means within said casing having a reciprocable operating rod extending through said outlet port to the exterior of said casing, a valve movable for opening and closing said port, means for locking said rod, means on said rod engaging said valve to open said outlet port when the rod is locked and means engaging said valve to close said port upon outward movement of the rod.

16. A filter comprising a casing, a filter unit dividing said casing into inlet and outlet sections, a tube communicating with both of said sections, an outlet port in alinement with said tube, a plunger slidably mounted in said tube, an operating rod for said plunger extending through said port, a self-closing valve for said port, and means associated with said rod for holding said valve open in one position thereof.

ROBERT P. F. LIDDELL.